US008588556B1

(12) United States Patent
Dong

(10) Patent No.: US 8,588,556 B1
(45) Date of Patent: Nov. 19, 2013

(54) ADVANCED MODULATION FORMATS USING OPTICAL MODULATORS

(71) Applicant: Alcatel-Lucent USA, Inc., Murray Hill, NJ (US)

(72) Inventor: Po Dong, Murray Hill, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/793,153

(22) Filed: Mar. 11, 2013

Related U.S. Application Data

(63) Continuation-in-part of application No. 13/538,525, filed on Jun. 29, 2012.

(51) Int. Cl.
| | |
|---|---|
| G02F 1/01 | (2006.01) |
| G02F 1/035 | (2006.01) |
| G02F 1/00 | (2006.01) |
| G02B 26/00 | (2006.01) |
| G02B 6/26 | (2006.01) |
| G02B 6/42 | (2006.01) |

(52) U.S. Cl.
USPC ...... 385/3; 385/1; 385/32; 359/237; 359/238; 359/300

(58) Field of Classification Search
None
See application file for complete search history.

(56) References Cited

U.S. PATENT DOCUMENTS

| | | | |
|---|---|---|---|
| 6,549,319 B2* | 4/2003 | Mahlab | 359/238 |
| 6,633,696 B1 | 10/2003 | Vahala et al. | |
| 6,778,318 B2* | 8/2004 | Sayyah et al. | 359/326 |
| 6,807,338 B2* | 10/2004 | Bouteiller et al. | 385/37 |
| 7,006,726 B2 | 2/2006 | Hayes | |
| 7,057,250 B2 | 6/2006 | Kolodzey et al. | |
| 7,110,632 B2 | 9/2006 | Abeles | |
| 7,174,064 B2 | 2/2007 | Sayyah et al. | |
| 7,292,791 B2* | 11/2007 | Sayyah et al. | 398/182 |
| 7,558,487 B2 | 7/2009 | Liu et al. | |
| 7,657,129 B2 | 2/2010 | Karras | |
| 7,729,576 B2* | 6/2010 | Kornilovich et al. | 385/32 |
| 8,027,587 B1* | 9/2011 | Watts | 398/79 |
| 8,032,027 B2* | 10/2011 | Popovic | 398/82 |
| 2001/0004411 A1 | 6/2001 | Yariv | |
| 2003/0002099 A1* | 1/2003 | Sayyah et al. | 359/124 |
| 2004/0228564 A1* | 11/2004 | Gunn et al. | 385/1 |
| 2004/0228638 A1* | 11/2004 | Sayyah et al. | 398/183 |

(Continued)

OTHER PUBLICATIONS

Zhang, Lin, et al., "Silicon Microring-Resonator-Based Modulation and Demodulation of DQPSK Signals", 2008, IEEE, 3 pages.

(Continued)

*Primary Examiner* — Rhonda Peace
(74) *Attorney, Agent, or Firm* — Hitt Gaines, PC

(57) ABSTRACT

An apparatus, comprising a substrate with a planar surface an optical power splitter on the surface, and an optical power combiner on the surface. The apparatus also comprises pairs of optical waveguides located on the planar surface, each waveguide of the pairs connecting a corresponding output of the optical power splitter to a corresponding input of the optical power combiner. The apparatus also comprises a plurality of optical resonators located on the surface, each of the resonators of the plurality being evanescently coupled to a corresponding one of the waveguides. For each particular one of the pairs, resonant frequencies of the optical resonators coupled to the waveguides of the particular one of the pairs are about the same. Resonant frequencies of each pair of the optical resonators coupled to two of the waveguides in different ones of the pairs are different.

19 Claims, 14 Drawing Sheets

(56) References Cited

U.S. PATENT DOCUMENTS

| | | |
|---|---|---|
| 2005/0111789 A1 | 5/2005 | Hayes |
| 2006/0008272 A1* | 1/2006 | Abeles .................. 398/48 |
| 2006/0215949 A1 | 9/2006 | Lipson et al. |
| 2007/0223859 A1* | 9/2007 | Kornilovich et al. ........... 385/15 |
| 2009/0060409 A1 | 3/2009 | Karras |
| 2009/0103863 A1 | 4/2009 | Lee et al. |
| 2009/0161113 A1 | 6/2009 | Chen et al. |
| 2009/0220228 A1* | 9/2009 | Popovic .................. 398/48 |
| 2010/0266233 A1 | 10/2010 | Morris et al. |
| 2011/0063710 A1* | 3/2011 | Chao et al. .................. 359/276 |
| 2012/0057866 A1 | 3/2012 | McLaren et al. |
| 2012/0105177 A1 | 5/2012 | McLaren et al. |

OTHER PUBLICATIONS

Dong, Po, et al., "Experimental Demonstration of Microring Quadrature Phase-Shift Keying Modulators", Optics Letters, vol. 37, No. 7, Apr. 1, 2012, pp. 1178-1180.

Heebner, John E., "Enhanced Linear and NonLinear Optical Phase Response of Microring Resonators for Engineerable Photonic Media", 2004, The Institute of Optics, SPIE 2004, 21 pages.

* cited by examiner

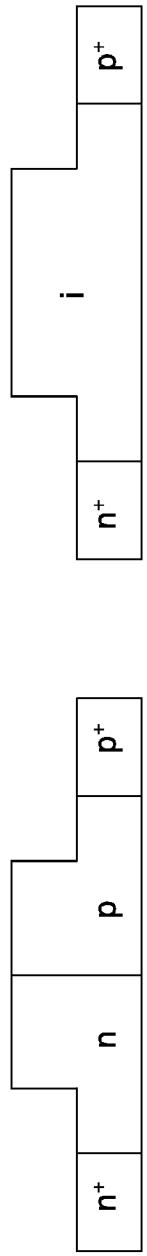
FIG. 5A
FIG. 5B
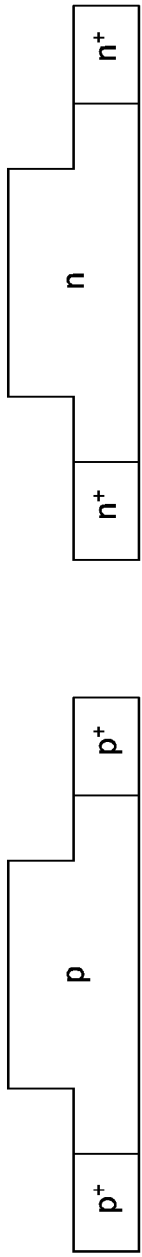
FIG. 5C
FIG. 5D
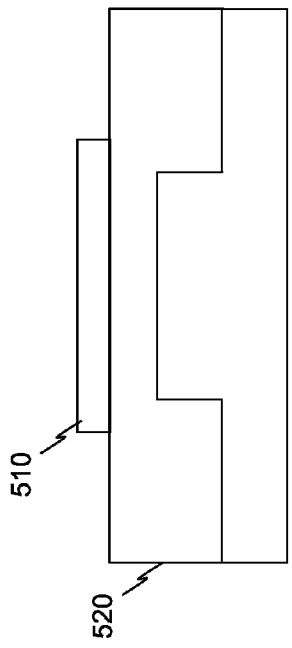
FIG. 5E

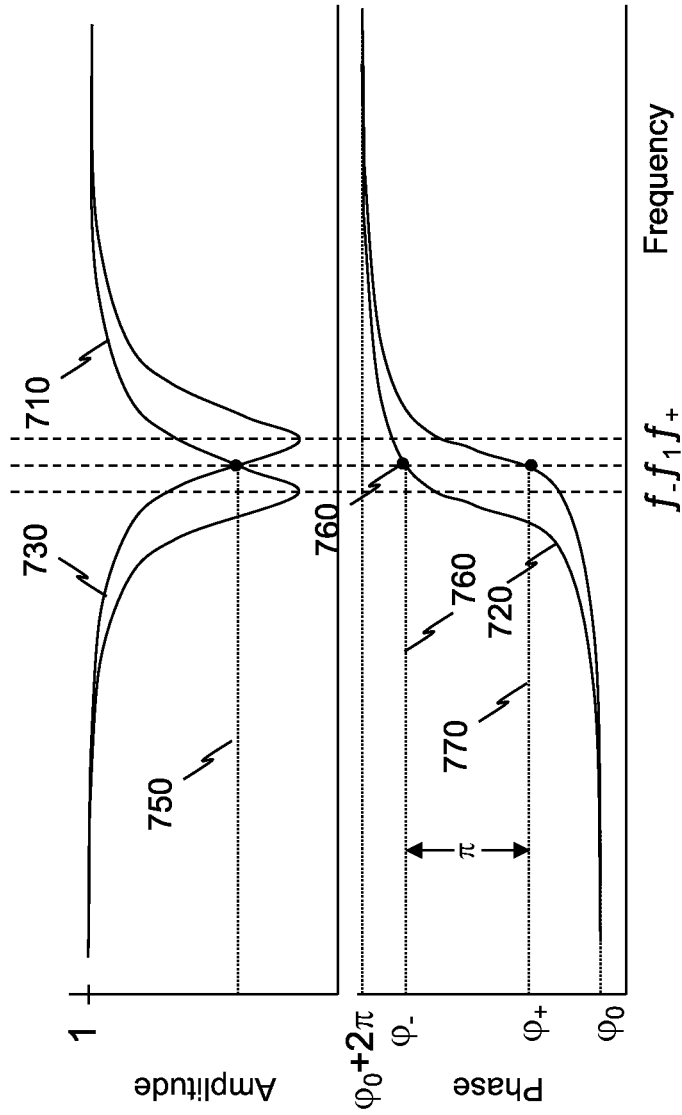

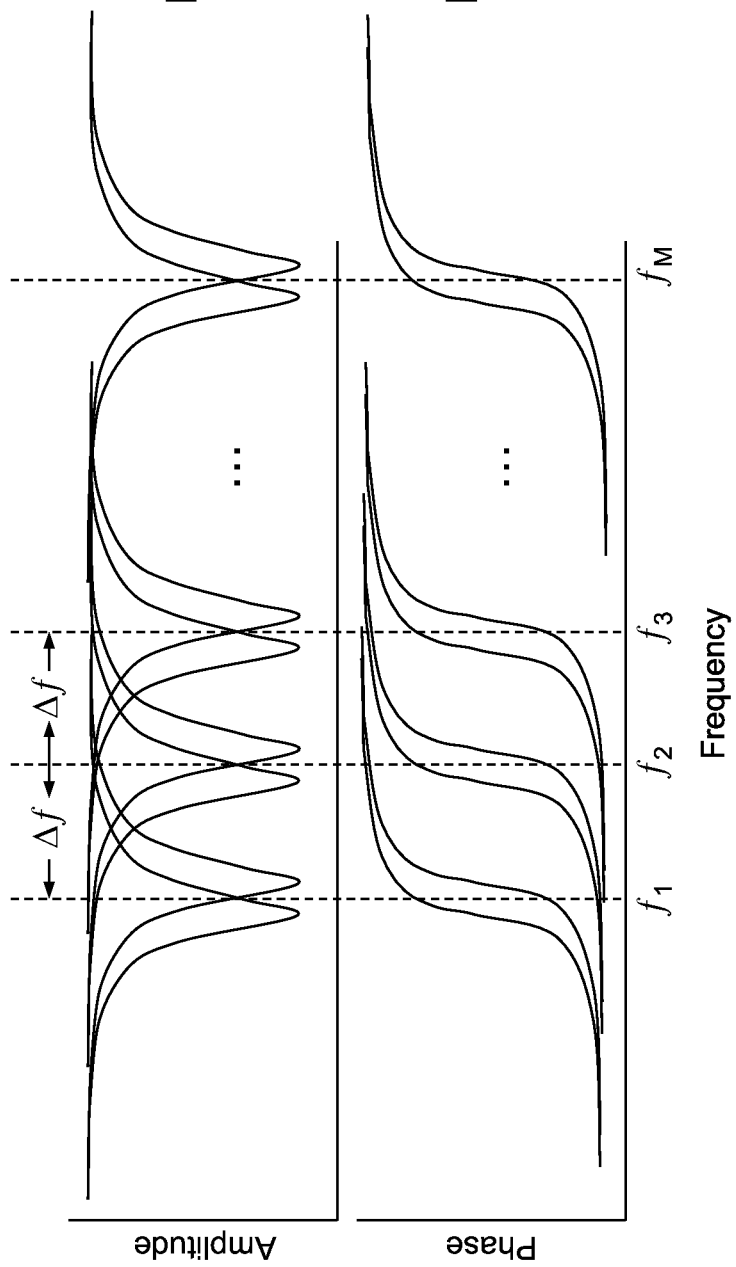

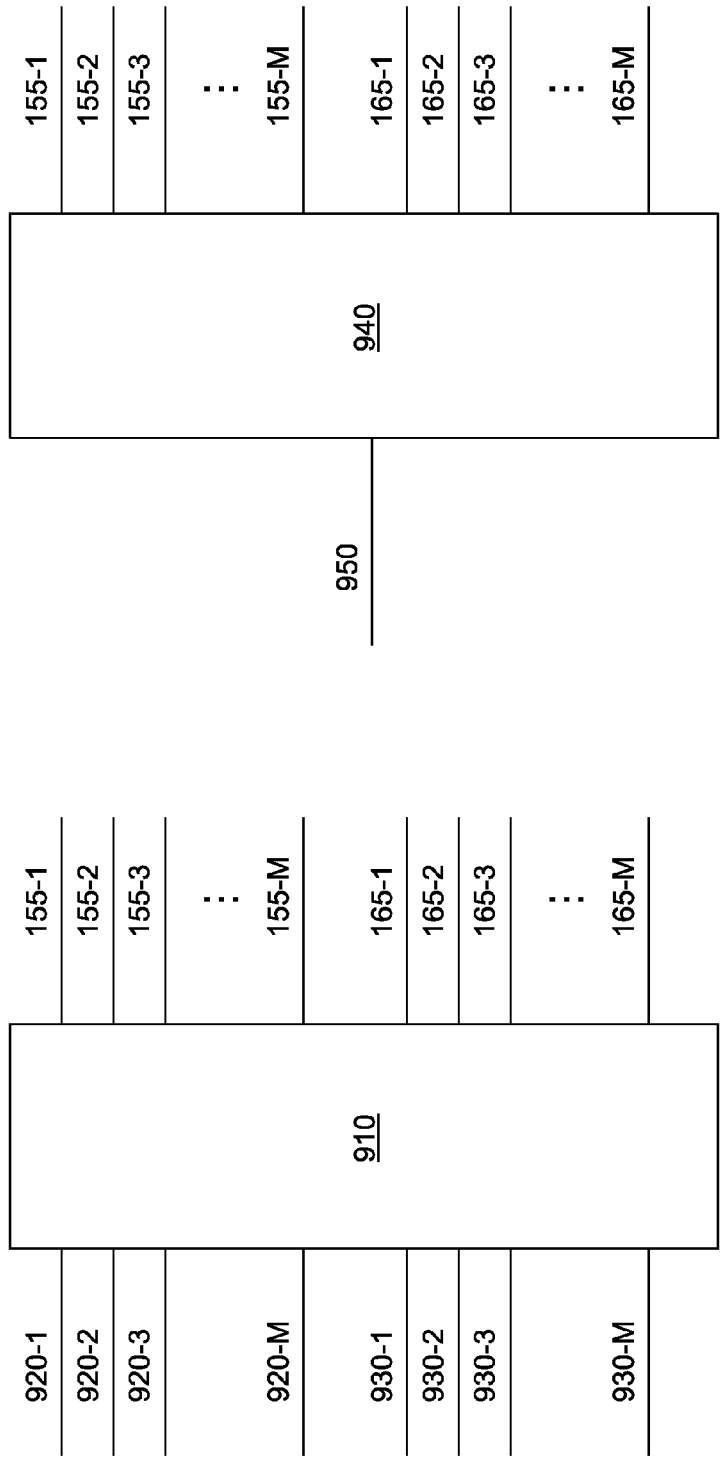

ADVANCED MODULATION FORMATS USING OPTICAL MODULATORS

CROSS-REFERENCE TO RELATED APPLICATION

This is a continuation in part application of U.S. application Ser. No. 13/538,525 filed on Jun. 29, 2012, entitled ADVANCED MODULATION FORMATS USING OPTICAL MODULATORS to Dong, which is commonly assigned with the present invention and incorporated herein by reference.

TECHNICAL FIELD

This application is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Optical modulators often use one or more Mach-Zehnder interferometers. These devices typically include electro-optic modulators. Such modulators have been implemented in various optical media, including silicon, compound semiconductors, and $LiNbO_3$. While these devices are capable of high-speed performance, they can also consume significant power, e.g. for heating or electrically polarizing waveguide segments to modulate the refractive index of the segments. When integrated into an optical system, a significant portion of the power consumption of the system may result from the optical modulators.

SUMMARY

One aspect provides an apparatus, comprising a substrate with a planar surface an optical power splitter on the surface, and an optical power combiner on the surface. The apparatus also comprises pairs of optical waveguides located on the planar surface, each waveguide of the pairs connecting a corresponding output of the optical power splitter to a corresponding input of the optical power combiner. The apparatus also comprises a plurality of optical resonators located on the surface, each of the resonators of the plurality being evanescently coupled to a corresponding one of the waveguides. For each particular one of the pairs, resonant frequencies of the optical resonators coupled to the waveguides of the particular one of the pairs are about the same. Resonant frequencies of each pair of the optical resonators coupled to two of the waveguides in different ones of the pairs are different.

In any of the embodiments, for each specific one of the pairs, the optical power splitter is configured to distribute about the same optical power to both of the waveguides of the specific one of the pairs. In any of the embodiments, the optical power splitter is configured to distribute different optical powers waveguides in different ones of the pairs. In any of the embodiments, the optical power splitter is configured to distribute different optical powers waveguides in different ones of the pairs. In any of the embodiments, the optical power splitter is configured to distribute optical powers to the different first, second, and third of the pairs of waveguides such that a ratio of the optical power distributed to the first of the pairs over the optical power distributed to the second of the pairs is about ½ and a ratio of the optical power distributed to the first of the pairs over the optical power distributed to the third of the pairs is about ¼. Any of the embodiments can further include an optical source optically coupled to the optical power splitter and configured to deliver an optical carrier signal to the optical power splitter in the S band, C band or L band frequency range. In any of the embodiments, the optical resonators are configured to be controllable such that the apparatus is able to output a quadrature-amplitude modulated optical signal including each signal point of a quadrature-amplitude modulation constellation including signal points of different positive amplitude. In some such embodiments, the constellation includes a quadrature-amplitude modulated $2^N$ signal, having N bits/symbol, where N/2 is equal to the number of the pairs. In any of the embodiments, for each specific one of the optical waveguides is evanescently optically coupled to a specific sequence of the optical resonators each of the optical resonators of the specific sequence is configured to resonantly couple at a different optical frequency. In some such embodiments, the apparatus is configured to produce a wavelength division multiplexed quadrature-amplitude modulated optical signal from an optical signal having a plurality of unmodulated optical carriers on non-overlapping optical wavelength channels and being received at an input of the optical power splitter.

Another aspect provides a method. The method comprises providing a substrate with a planar surface, providing an optical power splitter on the surface, providing an optical power combiner on the surface, providing pairs of optical waveguides located on the planar surface. Each waveguide of the pairs connecting a corresponding output of the optical power splitter to a corresponding input of the optical power combiner. The method also comprises providing a plurality of optical resonators located on the surface, each of the resonators of the plurality being evanescently coupled to a corresponding one of the waveguides. For each particular one of the pairs, resonant frequencies of the optical resonators coupled to the waveguides of the particular one of the pairs are about the same. Resonant frequencies of each pair of the optical resonators coupled to two of the waveguides in different ones of the pairs are different.

Any of the embodiments of the method, for each specific one of the pairs, the optical power splitter is configured to distribute about the same optical power to both of the waveguides of the specific one of the pair. In any embodiments, the optical power splitter is configured to distribute different optical powers waveguides in different ones of the pairs. In any embodiments, the optical power splitter is configured to distribute different optical powers waveguides in different ones of the pairs. In any embodiments, the optical power splitter is configured to distribute optical powers to the different first, second, and third of the pairs of waveguides such that a ratio of the optical power distributed to the first of the pairs over the optical power distributed to the second of the pairs is about ½ and a ratio of the optical power distributed to the first of the pairs over the optical power distributed to the third of the pairs is about ¼. Any embodiments of the method can further include including providing an optical source optically coupled to the optical power splitter and configured to deliver an optical carrier signal to the optical power splitter in the S band, C band or L band frequency range. In any embodiments, the optical resonators are configured to be controllable such that the apparatus is able to output a quadrature-amplitude modulated optical signal including each signal point of a quadrature-amplitude modulation constellation including signal points of different positive amplitude. In any embodiments, wherein the constellation includes a quadrature-amplitude modulated $2^N$ signal, having N bits/symbol, where N/2 is equal to the number of the pairs. In any embodiments, for each specific one of the optical waveguides is evanescently optically coupled to a specific sequence of the optical resonators each of the optical resonators of the specific sequence is configured to resonantly couple at a different optical frequency.

BRIEF DESCRIPTION

Reference is now made to the following descriptions taken in conjunction with the accompanying drawings, in which:

FIGS. 5A-5E illustrate sectional views of various embodiments of the resonator of FIG. 4, showing features that may be used to change the optical path length of the resonator, including electro-optic modulators (FIGS. 5A and 5B) and thermal phase shifters (FIGS. 5C-5E);

FIGS. 6A, 6B, 7A and 7B illustrate amplitude and phase characteristics of, e.g. one of the waveguides of FIG. 1 with an undercoupled ring resonator (FIGS. 6A and 6B) and an overcoupled ring resonator (FIGS. 7A and 7B);

Figure 1:
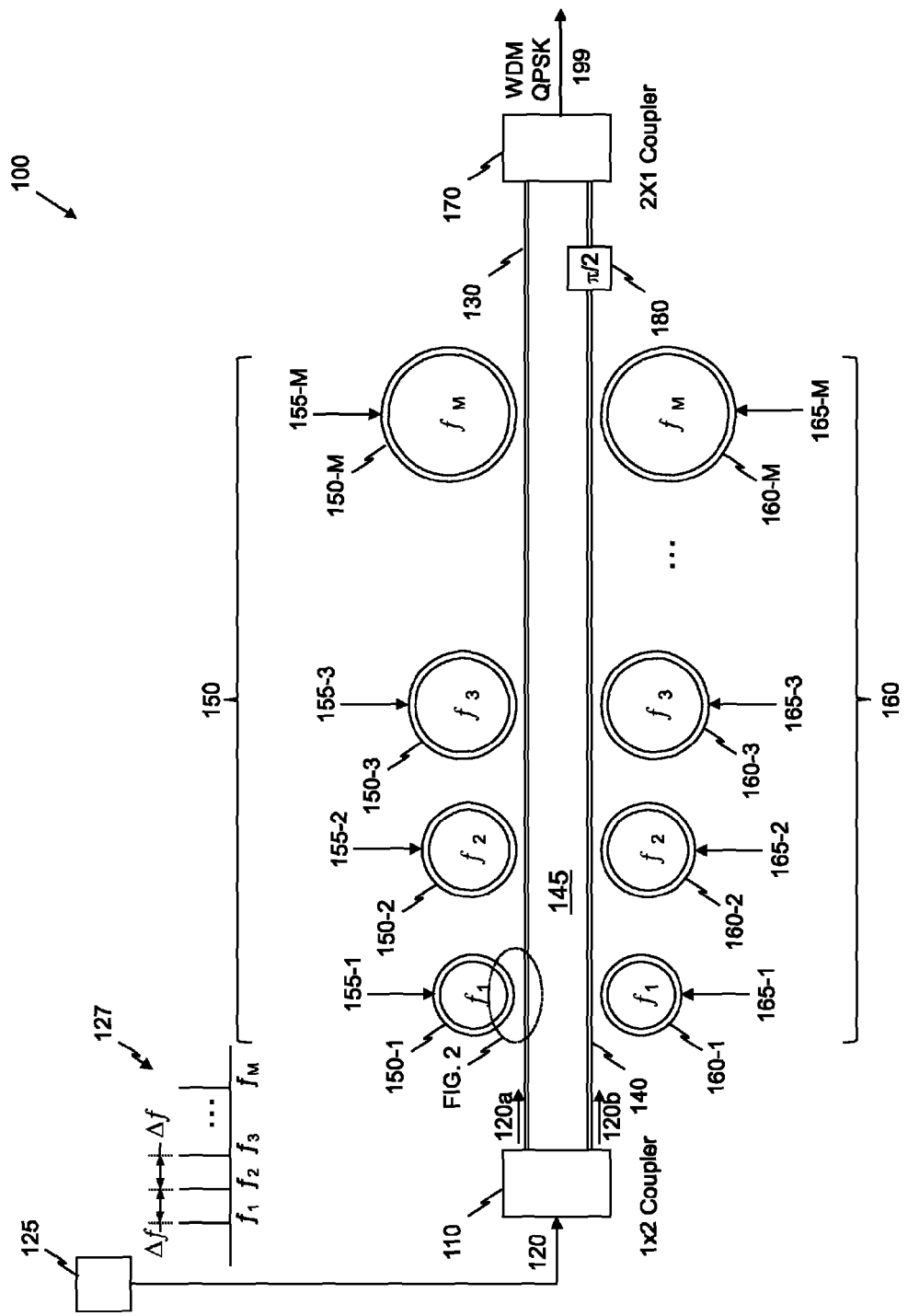
FIG. 1 illustrates an embodiment of the invention in which an optical system, e.g. a quadrature phase-shift keyed (QPSK) modulator, is implemented using a splitter, a combiner, a pair of two optical waveguides coupling the outputs of the splitter to the inputs of the combiner, and a plurality of pairs of optical microcavity resonators, e.g. ring resonators.
Figure 10:
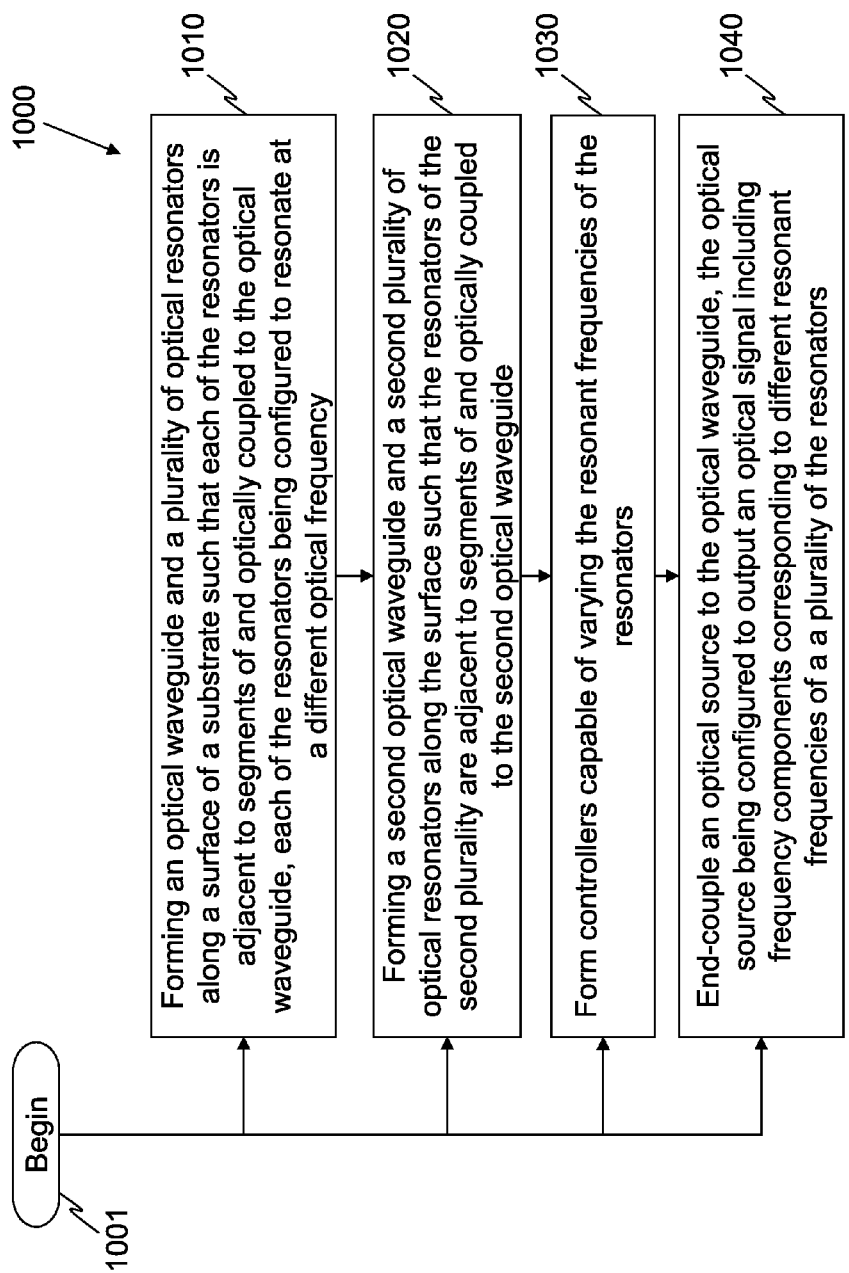
Figure 11:
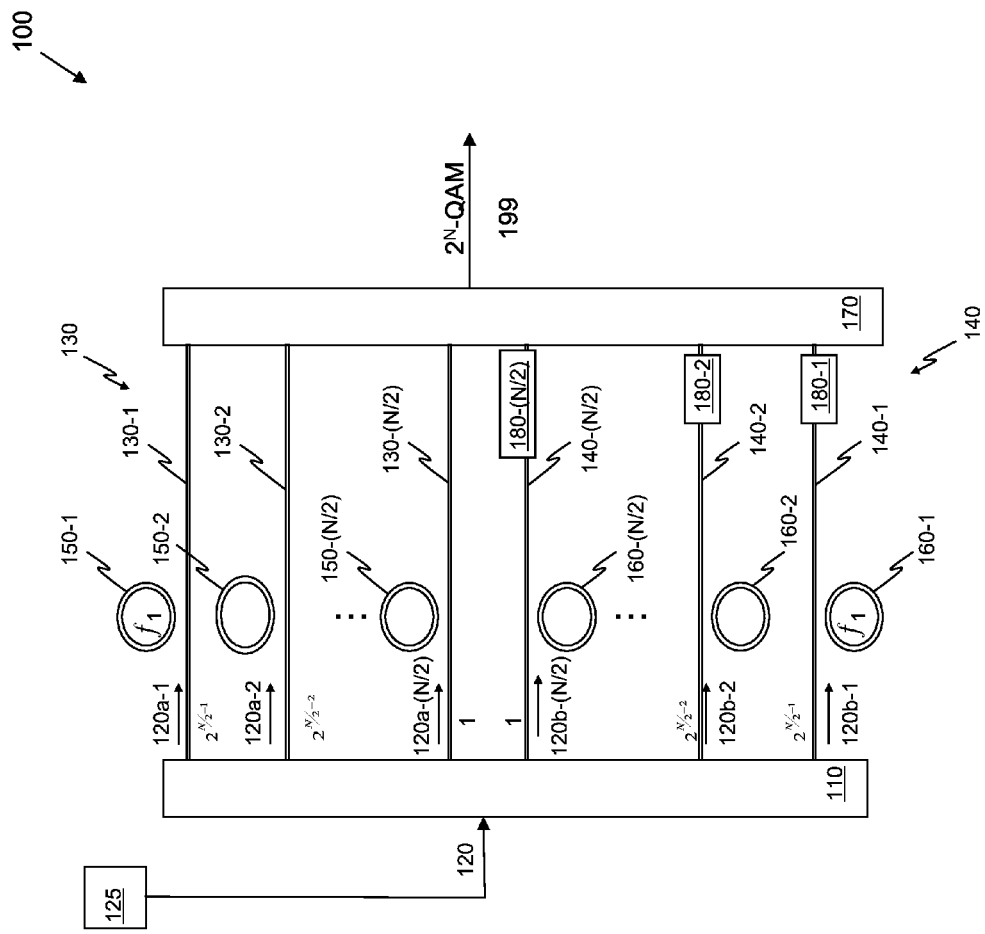
Figure 12:
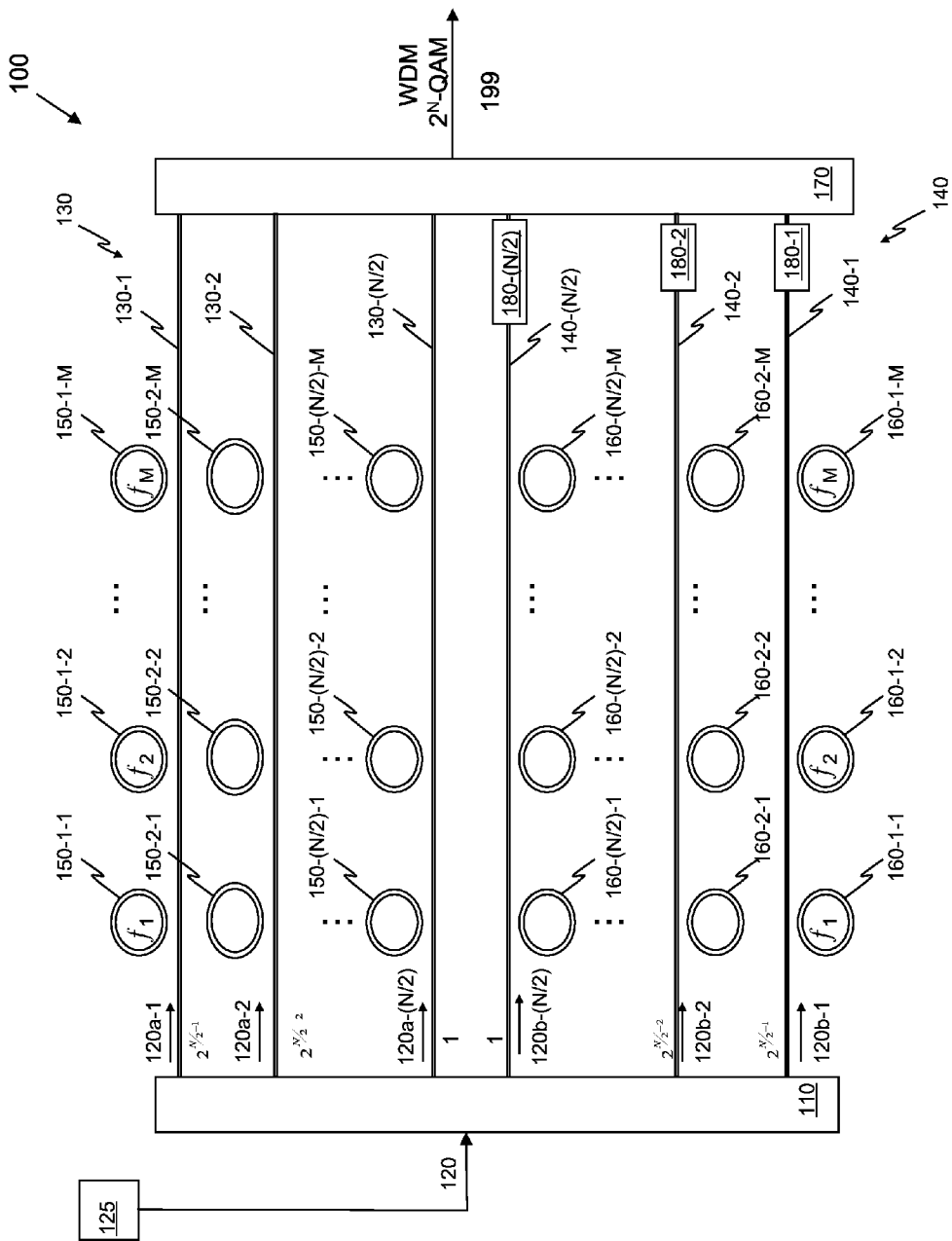
Figure 13:
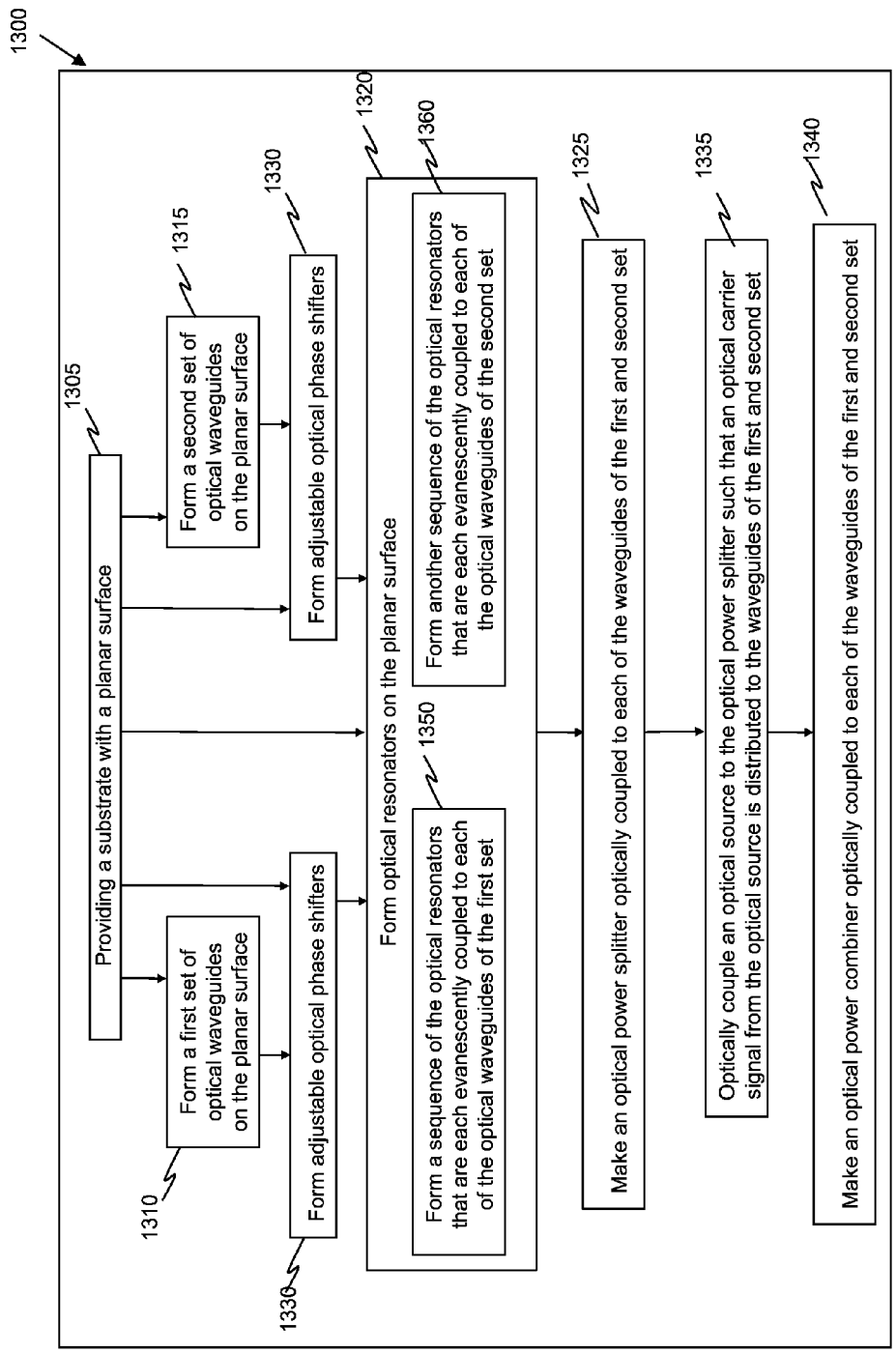
Figure 14:
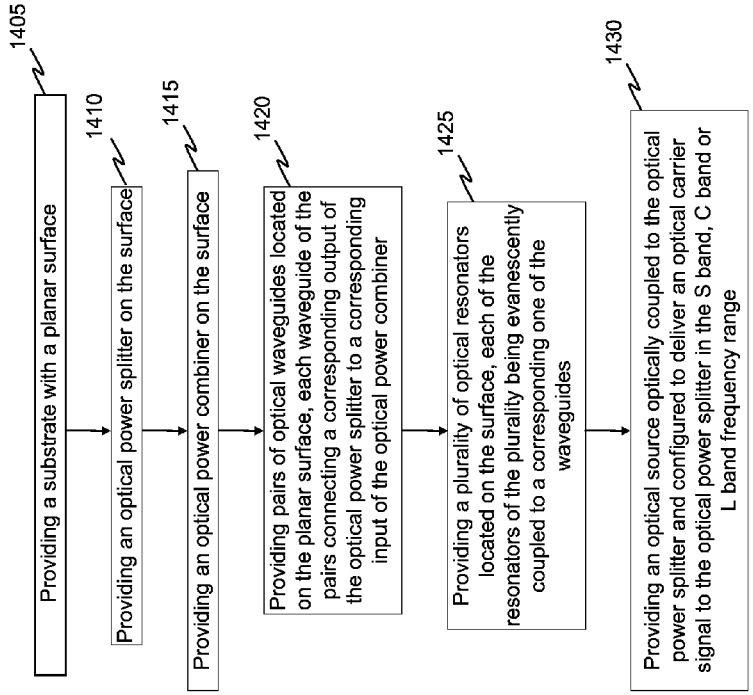

FIGS. 8A and 8B respectively illustrate amplitude and phase response of four transfer characteristics associated with a waveguide coupled to four ring resonators in FIG. 1, wherein each ring resonator is controllable to have one of two predetermined resonant frequencies, above and below a WDM channel frequency;

FIGS. 9A and 9B illustrate embodiments of a controller configured to control the resonant frequencies of the ring resonators of FIG. 1 to modulate a carrier signal;

FIG. 10 presents a method, e.g. for manufacturing an optical system such as described by various embodiments herein, e.g. FIGS. 1-9; and FIG. 11 presents a schematic diagram of an example embodiment of the apparatus of the disclosure configured to perform a quadrature-amplitude modulation of optical signals;

FIG. 12 presents a schematic diagram of an example embodiment of the apparatus of the disclosure configured to perform a wavelength division multiplexed quadrature-amplitude modulation of optical signals;

FIG. 13 presents a flow diagram of a method, e.g., method of manufacturing an apparatus, such as any of the example apparatuses discussed in the context of FIGS. 11-12 and, including any of the components discussed in the context of FIGS. 1-10; and FIG. 14 presents a flow diagram of a method, e.g., method of manufacturing an apparatus, such as any of the example apparatuses discussed in the context of FIGS. 11-12 and, including any of the components discussed in the context of FIGS. 1-10.

DETAILED DESCRIPTION

The inventor has determined that some limitations of conventional modulators may be overcome by using a plurality of controllable optical microcavity resonators, e.g. ring resonators, optically coupled to a waveguide to modulate the phase of an optical carrier signal at each of a plurality of wavelengths. Such an assembly may form the basis of a compact and low power optical modulator that can provide QPSK (quadrature phase-shift keyed) modulation of a plurality of channels in a WDM (wavelength-division multiplexed) communication system. Some described embodiments are expected to be relatively robust to manufacturing variation by providing a quasi-static adjustment of the resonant frequency of each ring resonator to compensate for such variation. Some described embodiments may be formed on common and inexpensive semiconductor substrates, e.g. silicon wafers, using processing tools commonly used in semiconductor processing. Thus some embodiments are expected to be manufacturable for a lower cost than similar systems using other architectures, such as those using MZIs (March-Zehnder Interferometers).

Silicon has a relatively weak electro-optic response as compared to $LiNbO_3$ and III-V semiconductors. This small response poses a significant challenge to using Si-based modulators employing a low-voltage silicon MZI. However, the inventor has realized that the electro-optic response of silicon may be sufficient for realization of effective and cost-effective optical modulators based on microcavity resonators. Moreover, low-voltage silicon modulators have the potential to significantly reduce the power consumption of some integrated photonic devices.

Turning to FIG. 1, an apparatus 100 is illustrated according to one embodiment, e.g. a WDM QPSK modulator. A 1×2 coupler 110 receives an optical carrier signal 120 to be modulated, e.g. an unmodulated (CW) laser output having a plurality of WDM channel wavelengths $\lambda_1, \lambda_2, \lambda_3, \ldots \lambda_M$, or equivalently a plurality of WDM channel frequencies $f_1, f_2, f_3, \ldots f_M$. In some embodiments the carrier signal 120 may already be modulated in a manner that is not incompatible with additional modulation applied by the apparatus 100. For example, the carrier signal 120 may also include a frequency that is not a member of the set $\{f_1, f_2, f_3, \ldots f_M\}$ that has previously been modulated to transmit data.

An optical source 125 may produce the carrier signal 120. The optical source 125 may include optical component(s), such as for example lasers and combiners, to produce the carrier signal 120. In some embodiments the optical source 125 produces a frequency comb such as exemplified by a comb 127 with signal components at channel frequencies $f_1, f_2, f_3, \ldots f_M$. The frequencies are not limited to any particular values, and may be in any wavelength band used in optical communications, e.g. in the S band (1460 nm-1530 nm), the C band (1530 nm-1565 nm) or the L band (1565 nm-1625 nm). Furthermore, the frequency components of the comb 127 may be spaced by a WDM grid spacing Δf, e.g. a regular, about even spacing of the frequency components by a same frequency difference, e.g. about 100 GHz.

The coupler 110 may, e.g., split the carrier signal 120 about equally in power, directing a first carrier portion 120a to a first optical waveguide 130, e.g. a planar or ridge waveguide. The coupler 110 directs a second carrier portion 120b to a second optical waveguide 140, e.g. a planar or ridge waveguide. The core regions of the optical waveguides 130 and 140 are surrounded by a cladding 145 that may include, e.g., an underlying dielectric material and/or an overlying dielectric material and/or air. In some embodiments a phase shifter 180 has a portion located in the optical path of the optical waveguide 140. In the illustrated embodiment the phase shifter 180 is configured to impose a net phase shift on the carrier portion 120*b* of about $\pi/2$, e.g., $\pi/2\pm20\%$ or more generally $(\pi/2\pm10\%)+n\pi$, wherein n=0, 1, 2 . . . . An optical combiner 170 receives the first and second signal portions from the optical waveguides 130 and 140 and combines these signal portions into an output signal 199.

The apparatus 100 includes a first set 150 and a second set 160 of microcavity resonators, e.g. ring resonators. For convenience the first and second sets 150 and 160 may be respectively referred to as ring resonators 150 and ring resonators 160, and a single ring resonator may be referred to a ring resonator 150 or 160 when further differentiation is not needed. The ring resonators 150 and 160 each resonate at one of a series of resonant frequencies separated by the free spectral range (FSR) of that ring resonator. The resonant frequencies of a particular ring resonator may be determined from the optical properties of the ring core and cladding materials, and the geometry of the particular ring. In various embodiments the frequency range of light of the carrier signal 120 is typically constrained to be within one FSR period of the ring resonator having the smallest FSR. The FSR is typically inversely proportional to the optical path length of the ring resonator, so a smaller ring diameter will result in a larger FSR of the ring resonators 150 and 160, easing the constraint on the carrier signal 120 frequency range. Thus, the frequency range of the carrier signal 120 may typically include only a single resonant frequency of each of the ring resonators 150, 160. This single resonant frequency may be referred to herein generally as $f_r$. The first set 150 includes ring resonators 150-1, 150-2, 150-3, . . . 150-M having corresponding resonant frequencies near $f_1, f_2, f_3, \ldots f_M$. The second set 160 includes ring resonators 160-1, 160-2, 160-3, . . . 160-M also having corresponding resonant frequencies near $f_1, f_2, f_3, \ldots f_M$. By "near", it is meant that the $f_r$ of each of the ring resonators 150 and 160 may be controlled as described below within a narrow range, which includes a corresponding WDM channel frequency, e.g. one of $f_1, f_2, \ldots f_M$. The range may be, e.g. less than about the grid spacing $\Delta f$. In some embodiments, the range may be no greater than about 10% of $\Delta f$.

In some embodiments the ring resonators 150 and 160 are organized as ring resonator pairs, as illustrated, such that a pair includes a ring resonator from each of the sets 150 and 160 having about a same resonant wavelength and about aligned to an axis normal to the waveguides 130 and 140. However, embodiments are not limited to such pairing. In the illustrated embodiment a first pair includes the ring resonator 150-1 and the ring-resonator 160-1 having a resonant frequency near $f_1$. A second pair includes the ring resonator 150-2 and the ring-resonator 160-2 having a resonant frequency near $f_2$. A third pair includes the ring resonator 150-3 and the ring-resonator 160-3 having a resonant frequency near $f_3$. An M-th pair includes the ring resonator 150-M and ring resonator 160-M having a resonant frequency near $f_M$. Embodiments are not limited to any particular number of ring resonators in the first and second ring resonator sets 150 and 160. Furthermore, one or both of the sets 150 and 160 may include one or more ring resonators that are not matched by a ring resonator having a same resonant frequency in the other of the sets 150, 160.

Figure 2:
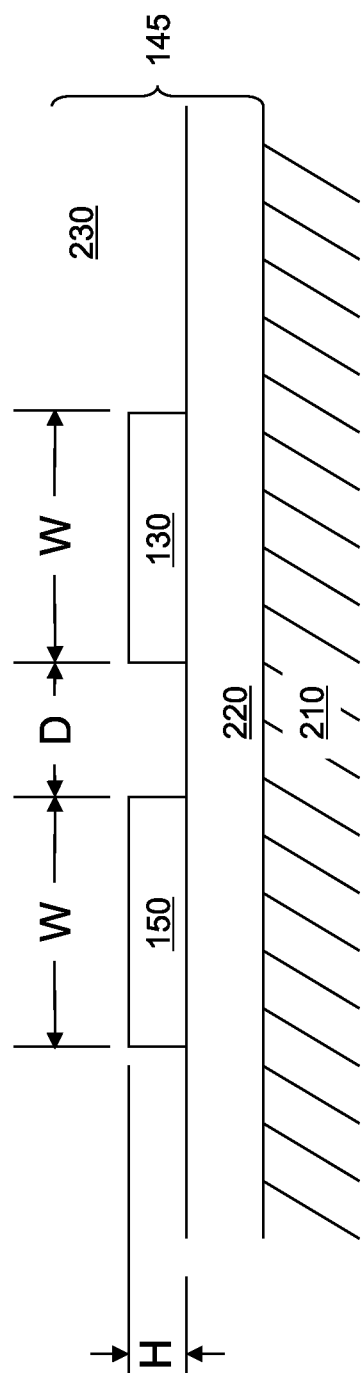
FIG. 2 illustrates a sectional view of an optical path of FIG. 1 and a proximate ring resonator, according to one embodiment of the optical system.
Figure 3:
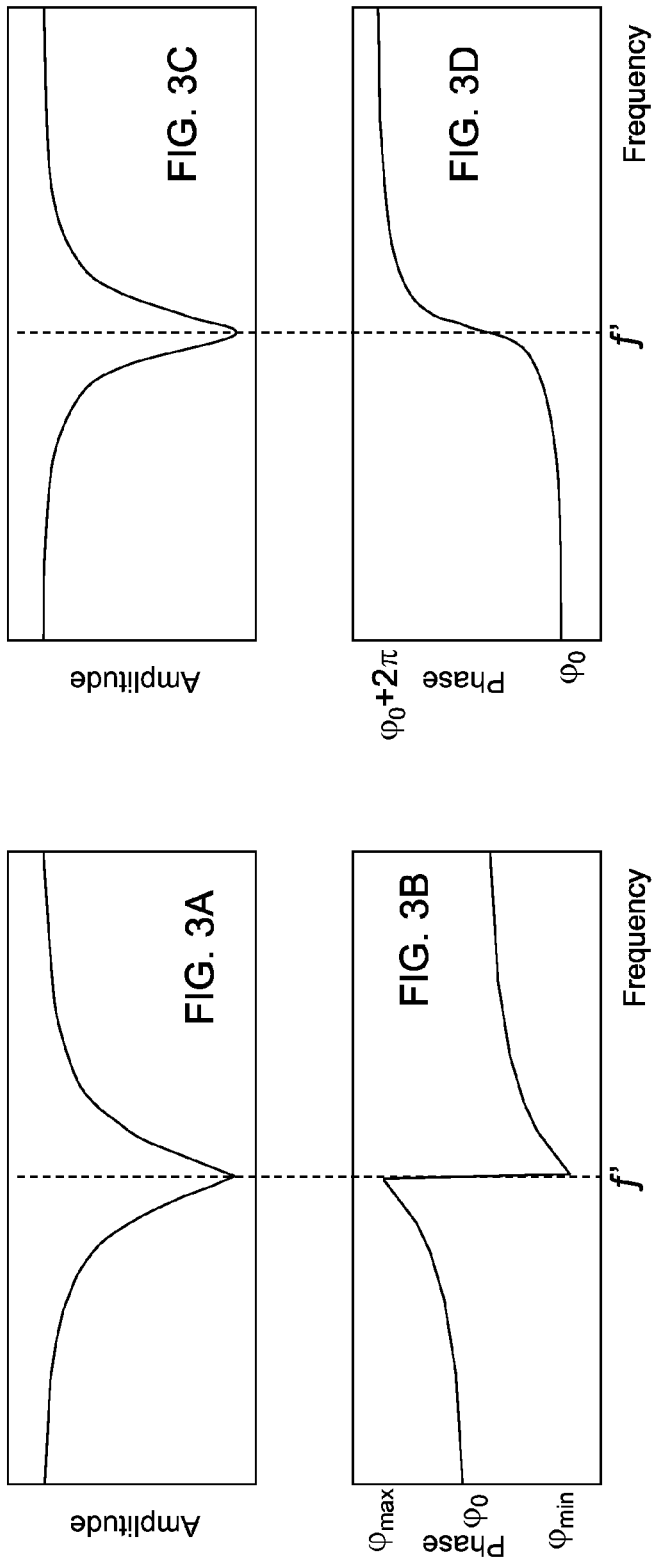
FIG. 3A-3D illustrates example amplitude and phase characteristics of a waveguide coupled to a ring resonator.

FIG. 2 schematically illustrates a sectional view of the core of the waveguide 130 and a representative ring resonator 150. For later reference, the core of the waveguide 130 and a segment of the optical core of the ring resonator 150 are shown as being separated by a lateral distance D. The waveguide 130 and the ring resonator 150 each have a width W and a height H. While the core of the waveguide 130 and the segment of the optical core of the ring resonator 150 are shown each having the same width, embodiments are not limited to such cases. The cores of the waveguide 130 and the ring resonator 150 may be formed from a semiconductor, e.g. silicon, over a substrate 210, e.g. a silicon wafer. The cladding 145 may include a dielectric layer 220 located between the substrate 210 and the waveguide 130, and between the substrate 210 and the waveguide ring resonator 150. The cladding 145 may also include a dielectric 230 overlying the dielectric layer 220. The dielectric layer 220 and the dielectric 230 serve as the cladding for the waveguide 130 and the ring resonator 150-1 such that optical signals are substantially confined in and guided by these structures.

A convenient platform on which to form the apparatus 100 is a silicon-on-insulator (SOI) wafer, but embodiments of the invention are not limited thereto. For example, a CVD dielectric layer, e.g. plasma oxide, could be formed on any suitable substrate, and a silicon layer could be formed thereover by any suitable method. Other embodiments may use a substrate formed from, e.g. glass, sapphire or a compound semiconductor. The dielectric 230 may be a suitable dielectric material, e.g. silicon oxide, silicon nitride, benzocyclobutene (BCB), or air. For the purpose of this disclosure, "air" includes vacuum.

The waveguide 130 and the ring resonator 150 may be formed from any conventional or nonconventional optical material system, e.g. silicon, LiNbO$_3$, a compound semiconductor such as GaAs or InP, or an electro-optic polymer. Some embodiments described herein are implemented in Si as a nonlimiting example. While embodiments within the scope of the invention are not limited to Si, this material provides some benefits relative to other material systems, e.g. relatively low cost and well-developed manufacturing infrastructure.

Referring again to FIG. 1, each of the ring resonators in the set 150 is optically coupled to the waveguide 130. Each of the ring resonators in the set 160 is optically coupled to the waveguide 140. Herein and in the claims, a ring resonator is defined as being optically coupled to a waveguide when that ring resonator is overcoupled or undercoupled to that waveguide, as further described below.

As appreciated by those skilled in the optical component arts, light propagating within the waveguide 130 may couple, e.g., via evanescent coupling to the ring resonators of the set 150, and light propagating within the waveguide 140 may couple to the ring resonators of the set 160, e.g., via the coupling of evanescent light. By such coupling, a portion of the optical energy propagating in the waveguides 130, 140 couples to the ring resonators 150, 160. The degree of coupling is dependent on, among other factors, the wavelength of the propagating light. When the optical path length of the microcavity resonator is an integer multiple of the wavelength of the coupled light, a relative maximum coupling may occur, producing a notch in the passband of the waveguide. As discussed further below, this notch response may be exploited for use in a low-power optical modulator.

Herein a ring resonator and a proximate segment of waveguide, e.g. the adjacent segment of the ring resonator 150 and the waveguide 130, are defined as being critically coupled when the coupling between them is about equal to the round-trip loss in the ring resonator. In this case, $D=D_c$ (FIG. 2). For example, if the round trip loss is about 1 dB, the ring resonator 150 and the waveguide 130 are critically coupled when the coupling therebetween is also about 1 dB. In other words, about a 1 dB portion of an optical signal propagating in the waveguide proximate the ring resonator is transferred to the ring resonator by, e.g. evanescent coupling. When $D<D_c$ the ring resonator and the waveguide are overcoupled, e.g. a greater portion of the signal is coupled from the waveguide to the ring resonator than is lost in one round trip of the coupled signal in the ring resonator. Conversely when $D>D_c$ the ring resonator and the waveguide are undercoupled, e.g. the coupling is less than the round-trip loss in the ring resonator. As further provided below, when D is greater than a maximum coupling distance $D_{max}$, the ring resonator and the waveguide may be regarded as uncoupled.

These aspects are illustrated further by FIGS. 3A-3D, in which the resonant frequency of an arbitrary ring resonator is about f'. FIGS. 3A and 3B respectively show simplified and nonlimiting amplitude and phase characteristics of a transfer function $G_{uc}(f)$ of a waveguide, e.g. the waveguide 130, coupled to an adjacent segment of a ring resonator, e.g. the ring resonator 150-1, for the case that the waveguide and ring resonator are undercoupled. FIGS. 3C and 3D respectively show simplified and nonlimiting amplitude and phase characteristics of a transfer function $G_{oc}(f)$ of a waveguide, e.g. the waveguide 130, coupled to a ring resonator, e.g. the ring resonator 150-1, for the case that the waveguide and ring resonator are overcoupled.

The amplitude characteristics of the transfer functions $G_{uc}(f)$ and $G_{oc}(f)$ are qualitatively similar, each having a local minimum at f' for both the undercoupled case (FIG. 3A) and the overcoupled case (FIG. 3C). For the undercoupled case the phase of the transfer function $G_{uc}(f)$ (FIG. 3B) increases from $\phi_o$ at f<<f' to a local maximum $\phi_{max}$ at f'−δ (where δ is a small value, e.g. no greater than about 5% of Δf), and from a local minimum $\phi_{min}$ at f'+δ to $\phi_o$ at f>>f'. The phase may have an indeterminant value at about f'. For the overcoupled case the phase of the transfer function $G_{oc}(f)$ (FIG. 3D) increases smoothly from an initial value $\phi_{min}=\phi_o$ at f<<f' to a final value of $\phi_{max}=\phi_o+2\pi$ at f>>f'. In both FIGS. 3B and 3D $\phi_o$ is arbitrary, and $\phi_o$ may be different in the two figures.

As discussed further below, when $\phi_{max}-\phi_{min}$ is about π radians the coupling between the ring resonator 150 and the waveguide 130 may be exploited to produce BPSK (binary phase-shift keyed) modulation on a signal propagating in the waveguide 130. In the overcoupled case $\phi_{max}-\phi_{min}$ is expected to always meet this condition. In the undercoupled case $\phi_{max}-\phi_{min}$ may be at least about π when the coupling between the ring resonator and the waveguide is sufficiently strong, e.g. when $D \leq D_{MAX}$.

Accordingly, herein and in the claims an optical waveguide and a microcavity resonator are "optically coupled" when they are overcoupled, critically coupled, or undercoupled. The term "undercoupled" with respect to a ring resonator and a proximate waveguide is defined as meaning that the ring resonator and the waveguide are not overcoupled, but are sufficiently coupled to produce a phase change in the transfer function of the waveguide of at least about π radians. A ring resonator whose core segments are distant enough from a waveguide, e.g. $D>D_{max}$ such that any phase change of the transfer function produced by the ring resonator is less than about π radians is considered "uncoupled".

Referring back to FIG. 1, each of the ring resonators of the set 150 may have a different physical path length. The ring resonators are not limited to any particular path shape. For instance, the optical path of the ring resonators may have a path shape may be preferred to reduce losses in the ring resonator. In the example case of a circular path, the ring resonator 150-1 may have a radius $r_1$, the ring resonator 150-2 may have a radius $r_2>r_1$, the ring resonator 150-3 may have radius $r_3>r_2$ and so on. The radius $r_1$ may be selected such that the ring resonator 150-1 has a physical path length that causes the optical coupling of the waveguide 130 thereto to resonate at about $f_1$. The radius $r_2$ may be selected such that the ring resonator 150-2 has a physical path length that causes the optical coupling of the waveguide 130 thereto to resonate at about $f_2$. The radius $r_3$ may be selected such that the ring resonator 150-3 has a physical path length that causes the optical coupling of the waveguide 130 thereto to resonate at about $f_3$, and so on as illustrated.

Figure 4:
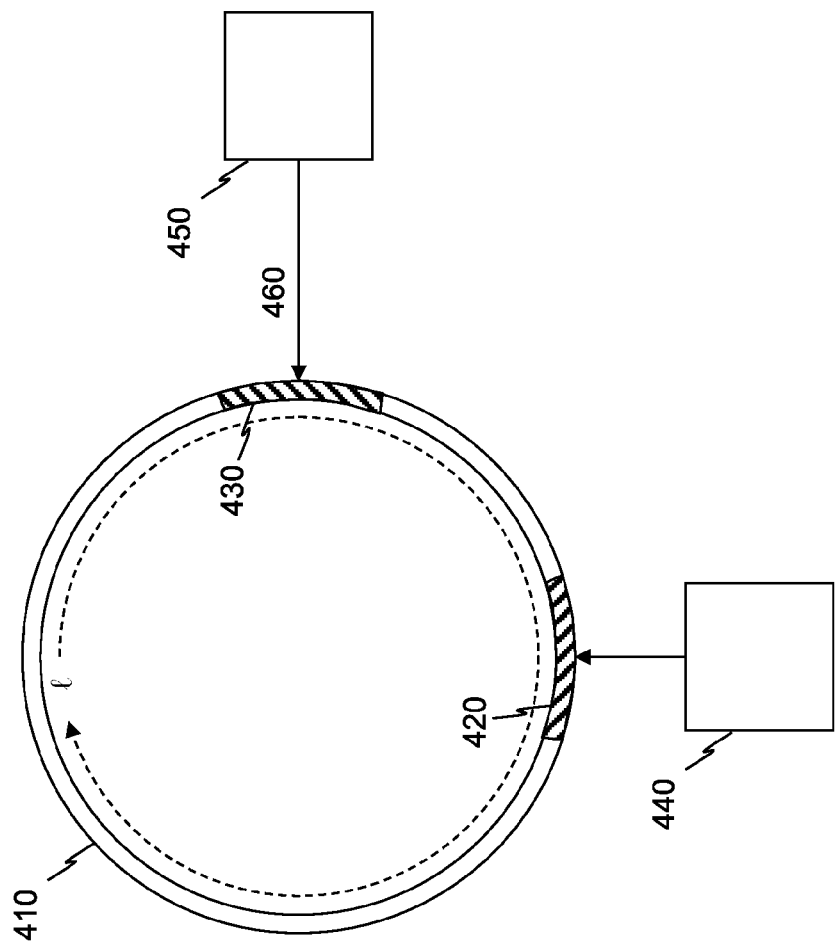
FIG. 4 illustrates a single ring resonator, e.g. one of the ring resonators of FIG. 1, with a quasi-static optical path length adjuster, and a high-speed optical path length adjuster configured to modulate the path length at a rate between one or a few GHz and tens of GHz.

FIG. 4 illustrates a nonlimiting embodiment of a single ring resonator 410 with a resonant frequency f' that may be representative of any of the ring resonators 150, 160. The ring resonator 410 has an optical path length l, and includes two electrically or thermally controllable optical path length adjusters, e.g. phase shifters, 420 and 430. A controller 440 provides an appropriately configured signal to control the electrically or thermally controllable phase shifter 420. A controller 450 provides an appropriately configured signal to control the electrically or thermally controllable phase shifter 430 via a control line 460.

The controllable phase shifter 420 may be configured to provide a quasi-static, e.g. relatively slow, adjustment to the optical path length l, while the adjuster 430 may be configured to provide a relatively fast adjustment of the same optical pathlength l. For example, the controllable phase shifter 420 may be a thermal phase shifter with a response time on the order of one second. Such a slow phase shifter may be useable for the purpose of fine tuning the optical path length to account for, e.g. a manufacturing or operating temperature variation of the optical path length l. The $f_r$ of each resonator may be tuned to be about equal to one of the WDM channel frequencies $f_1 \ldots f_M$, e.g., by setting such slow phase shifters appropriately. The controllable phase shifter 430 may be an electro-optic phase shifter that is useable for the purpose of rapidly modulating the optical path length between one of two predetermined values. For example, the controller 450 may modulate the optical path length l at a rate between one or a few GHz and tens of GHz to provide for data modulation of an optical carrier. As described further below the modulation may cause the ring resonator 410 to rapidly switch between a resonant frequency of $f_n-\delta$ and $f_n+\delta$, where n=1, 2, 3, . . . m to thereby impart data on an optical carrier signal having one of the channel frequencies $f_1, f_2, f_3, \ldots f_m$ wherein the carrier signal is propagating in an adjacent and optically coupled or couplable waveguide.

Referring back to FIG. 1, each of the ring resonators 150-1, 150-2, 150-3 . . . 150-M includes a corresponding control line 155-1, 155-2, 155-3, . . . 155-M. Similarly each of the ring resonators 160-1, 160-2, 160-3 . . . 160-M includes a corresponding control line 165-1, 165-2, 165-3, . . . 165-M. Each of the control lines 155 and 165 may be configured to provide a modulation signal to the corresponding ring resonator as described with respect to the control line 460 in FIG. 4.

FIGS. 5A-5E illustrate without limitation cross sections of several examples of ring resonators formed from a semiconductor, e.g. silicon, and configured to have adjustable resonant frequencies. While the embodiments of FIGS. 5A-5E are presented as examples of suitable structures for enabling variable control of the resonant frequency of the ring resonators 150 and 160, embodiments of the invention are not limited to any particular type of resonant frequency control, which may be implemented by any conventional or future-discovered method.

FIGS. 5A and 5B illustrate ring resonators whose resonant frequencies are controllable by electro-optic modulation. These structures may provide high frequency switching, and thus may be suitable for the controllable phase modulator 430. The ring resonator in FIG. 5A includes an optical core region that has n-doped and p-doped portions that form a p-n junction, e.g. a p-n diode. Heavily doped $n^+$ and $p^+$ regions provide electrical contact to the core region. The core regions are constructed so that the refractive index of the semiconductor core is dependent on the electron concentration. The electron concentration may be modulated by applying a variable back-bias on the p-n junction. By changing the refractive index the optical path length of the ring resonator, the ring resonator's resonant frequency is changed. The ring resonator in FIG. 5B includes an optical core region formed from an intrinsic semiconductor. Doped $n^+$ and $p^+$ regions provide electrical contact to the intrinsic region and form a p-i-n diode. As described with respect to FIG. 5A, the resonant frequency of the ring resonator of FIG. 5B may also be modulated by varying the electron density of the intrinsic region through the modulation of a back-bias across the p-i-n diode.

FIGS. 5C-5E illustrate in sectional view embodiments of ring resonators in which the resonant frequencies may be changed by heating the ring-like waveguide core therein. These structures provide relatively slow optical path length adjustments, and thus may be suitable for the controllable phase shifter 420. In FIG. 5C the core region of the ring resonator's waveguide is formed from a p-type semiconductor, and heavily doped $p^+$ regions provide electrical contact to the core region. FIG. 5D illustrates a similar embodiment in which the core region is formed from an n-type semiconductor and heavily doped $n^+$ regions provide electrical contact to the core. In each of these embodiments the waveguide of the ring resonator, or a segment thereof, may be heated by passing current through the core region via the heavily doped regions. In response, resistive heating will warm the ring resonator, which changes the refractive index thereof by the thermo-optic effect, thereby changing the resonant frequency. FIG. 5E shows another embodiment that relies on heating, but for this embodiment, the heating is provided by a resistive heater element 510 formed over a cladding layer 520. Those skilled in the art are familiar with forming resistive heater elements.

Figure 6A:
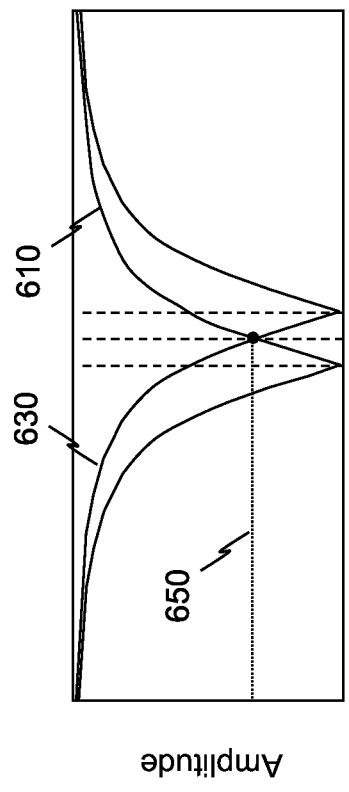
Figure 6B:
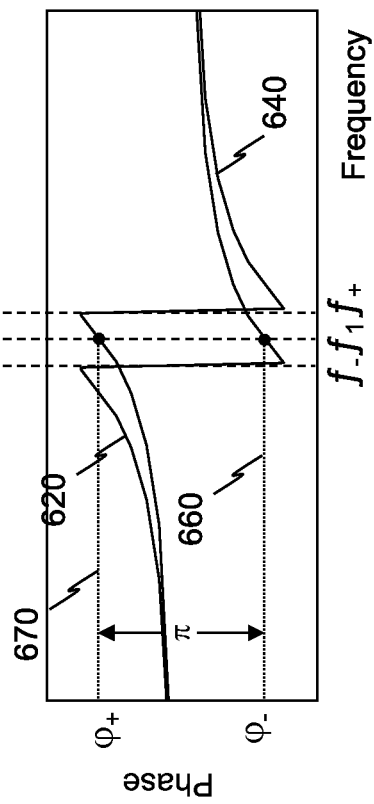

Now considering FIGS. 6A and 6B, illustrated are amplitude and phase characteristics of the transfer function of a waveguide, e.g. the waveguide 130, which is undercoupled to a ring resonator, e.g. the ring resonator 150-1. The following discussion is presented with reference to the ring resonator 150-1. Based on this description, it will be immediately apparent to those skilled in the art that the described principles also may be applied to the other ring resonators. The ring resonator 150-1 is configured to switch between a resonant frequency of $f_1-\delta$ and $f_1+\delta$ in response to application of control signals thereto. For the ring resonator 150-1, an amplitude characteristic 610 and a phase characteristic 620 are associated with the lower resonant frequency at $f_1-\delta$ (i.e., indicated as $f_-$), and a different amplitude characteristic 630 and a different phase characteristic 640 are associated with the higher resonant frequency at $f_1+\delta$ (i.e., indicated as $f_+$).

Considering first the case in which the resonant frequency of the ring resonator is $f_1-\delta$, when the optical signal portion 120a having a frequency of $f_1$ propagates within the waveguide 130, the signal is attenuated by the amplitude characteristic 610 to a value 650. The frequency of the optical signal is considered to correspond to the resonant frequency of the ring resonator by virtue of being about equal to the frequency at which the amplitude characteristics 610 and 630 intersect, e.g. $f_1$. The phase of the signal is shifted by the phase characteristic 620 to a value 660 indicated as $\phi_-$. Now when the resonant frequency of the ring resonator is $f_1+\delta$, the signal is again attenuated by the amplitude characteristic 630 to about the same value 650. However, the phase of the signal is shifted to a value 670 indicated as $\phi_+$ by the phase characteristic 640. The size of $\delta$ can be set such that the relative phase shift $\phi_- - \phi_+$ is about $\pi$ radians. Thus the propagating signal may be BPSK modulated by controllably switching the resonant frequency of the ring resonator between $f_1-\delta$ and $f_1+\delta$.

FIGS. 7A and 7B illustrate amplitude and phase characteristics for an example case in which a waveguide, e.g. the waveguide 130, is overcoupled to a controllable ring resonator, e.g. the ring resonator 150-1 during two different modulation states thereof. An amplitude characteristic 710 and a phase characteristic 720 respectively describe the amplitude reduction and phase shift produced by the coupling between the ring resonator and the waveguide when the resonant frequency $f_r$ of the ring resonator 150-1 is $f_1-\delta$ (i.e., indicated as $f_-$). An amplitude characteristic 730 and a phase characteristic 740 respectively describe the amplitude reduction and phase shift produced by the coupling between the ring resonator and the waveguide when $f_r=f_1+\delta$ (i.e., indicated as $f_+$). For both the amplitude characteristics 710 and 730 the propagated signal amplitude is reduced to a value 750 at the carrier frequency $f_1$. For the case that $f_r=f_1-\delta$, the phase shift of an optical carrier, at the frequency $f_1$, is shown by the phase characteristic 720 as being $\phi_-$ at reference 760. For the case that $f_r=f_1+\delta$, the phase shift of an optical carrier, at the frequency $f_1$, is shown by the phase characteristic 740 as $\phi_+$ at reference 770. As described previously, the value of $\delta$ may be selected such that the relative phase shift $\phi_- - \phi_+$ for the two different modulation states is about $\pi$ radians. Thus, the optical carrier signal at carrier frequency $f_1$ and propagating in the waveguide 130 may be BPSK modulated by such an operation on an over coupled ring resonator.

FIGS. 8A and 8B respectively schematically illustrate attenuation and phase characteristics of a waveguide, e.g. the waveguide 130, when overcoupled to a plurality of ring resonators, e.g. the ring resonators 150-1, 150-2, 150-3, . . . 150-M. The waveguide may transmit optical carriers propagating at a plurality of frequencies, e.g. $f_1, f_2, f_3, \ldots f_M$, as produced by the optical source 125, e.g., a WDM multi-channel optical source or a wavelength tunable optical source. By appropriately switching the modulation states of the ring resonators 150, any signal component of the optical carrier portion 120a at $f_1, f_2, f_3, \ldots f_M$ may be independently BPSK modulated with a series of ring resonators whose coupling characteristics to the waveguide 130 are as shown in FIGS. 8A-8B. Similarly, by appropriately modulating the states of the series of ring resonators 160 any signal component of the carrier portion 120b at $f_1, f_2, f_3, \ldots f_M$ may be BPSK modulated.

Recalling FIG. 1, the phase shifter 180 in line with or coupled to the waveguide 140 (FIG. 1) may apply about a relative $\pi/2$ phase shift to the carrier portion 120b. Then, when the combiner 170 recombines the carrier portions 120a and 120b, a QPSK modulated output signal 199 will result such that the waveguide 130 and the waveguide 140 produce the respective in-phase and quadrature components of the QPSK modulated output signal 199. Because the ring resonators 150 and 160 may independently modulate multiple wavelength components of the carrier signal 120, the apparatus 100 provides the ability to perform WDM QPSK. Implementations of the apparatus 100 may be very compact, e.g., integrated optical devices, thereby providing, in some embodiments, small and low-cost WDM QPSK optical modulators.

FIGS. 9A and 9B illustrate two representative and nonlimiting embodiments of electrical modules for mapping input data to the control lines 155-1, 155-2, 155-3, . . . 155-M and 165-1, 165-2, 165-3, . . . 165-M as shown in FIG. 1. FIG. 9A illustrates an electrical switching module 910. The switching module 910 is configured to receive data streams at inputs 920-1, 920-2, 920-3 . . . 920-M for corresponding ones of the control lines 155-1, 155-2, 155-3, . . . 155-M. The switching module 910 is further configured to receive data at inputs 930-1, 930-2, 930-3 . . . 930-M for corresponding ones of the control lines 165-1, 165-2, 165-3, . . . 165-M. The electrical switching module 910 is controllable to permute the mapping data streams at the inputs 920-1-920-M and 930-1-930-M onto the set of control lines 155-1-155-M and 165-1-165-M. For that reason, the switching module 910 enables different mappings of received WDM data streams onto the channels modulated by the apparatus 100 of FIG. 1. FIG. 9B illustrates an electrical power-splitter module 940 configured to receive a single electrical modulation signal at input 950 and to power split the signal to produce therefrom individual electrical control signals for each of the control lines 155-1, 155-2, 155-3, . . . 155-M, and each of the control lines 165-1, 165-2, 165-3, . . . 165-M.

With the switching module 910, each of the ring resonators 150 and 160 may be treated as a modulator for a single frequency channel that may be modulated independently of the other frequency channels of a WDM optical carrier. The module 910 enables rearrangements of the separate data streams over the set of optical modulation channels. With the module 940, a data stream received via the input 950 may be power-divided between the control lines 155 and 165 to modulate the ring resonators 150 and 160 in a coordinated fashion to transmit the received data stream. Those skilled in the art will appreciate that the ring resonators 150 and 160 may be operated by modules such as the modules 910, 940 and variants thereof to provide various combinations of independent and coordinated modulation to transmit data. Each of the modules 910 and 940 may include any combination of electronic components as needed to implement the desired mapping of the received data to the control outputs. The type of electrical output may correspond to the type of control signal appropriate to the modulation structure of the ring resonators 150, 160, e.g. as illustrated in FIG. 4.

Turning now to FIG. 10, a method 1000 is described, e.g. for forming an optical device according to various embodiments. The steps of the method 1000 are described without limitation by reference to elements previously described herein, e.g. in FIGS. 1-9. The steps of the method 1000 may be performed in another order than the illustrated order, and in some embodiments may be omitted altogether and/or performed concurrently or in parallel groups. The method 1000 is illustrated without limitation with the steps thereof being performed in parallel fashion, such as by concurrent processing on a common substrate. Other embodiments, e.g. those utilizing multiple substrates, may perform the steps partially or completely sequentially and in any order.

The method 1000 begins with an entry 1001. In a step 1010 an optical waveguide, e.g. the waveguide 130, and a plurality of optical resonators, e.g. the resonators 150, are formed along a surface of a substrate. The forming is performed such that each of the resonators is adjacent to segments of and optically coupled to the optical waveguide. Each of the resonators is configured to resonate at a different optical frequency.

Some embodiments of the method 100 include a step 1020 in which a second optical waveguide is formed, e.g. the waveguide 140, and a second plurality of optical resonators is formed, e.g. the resonators 160, along the surface. The resonators of the second plurality are adjacent to segments of and optically coupled to the second optical waveguide. Each resonator of the second plurality is configured to resonate at about an optical resonant frequency of a corresponding one of the resonators of the first plurality.

Some embodiments of the method 1000 include a step 1030 in which controllers are formed, e.g. the controllers 440 and 450. The controllers are capable of varying the resonant frequencies of the resonators. Some embodiments of the method 1000 include a step 1040 in which an optical source, e.g. the optical source 125, is end-coupled to the optical waveguide. The optical source is configured to output an optical signal including frequency components corresponding to different resonant frequencies of a plurality of the resonators.

In any embodiment of the method 1000 the forming may include making an optical power splitter, e.g. the splitter 110. The splitter has first and second outputs connected to ends of corresponding ones of the optical waveguides. In any such embodiment the first and second pluralities of optical resonators may be operable to WDM QPSK modulate an optical carrier received by the optical power splitter.

In any embodiment of the method 1000, the forming may include making an optical combiner, e.g. the combiner 170. The combiner has first and second inputs connected to ends of corresponding ones of the optical waveguides. In any embodiment, some of the resonators may be overcoupled to the optical waveguide. In any embodiment optical core regions of the optical waveguide and the resonators may be formed silicon regions located over a dielectric layer. In any embodiment each resonator may include a first optical phase shifter configured to enable quasi-static optical path adjustments of the each resonator, and may include a second optical phase shifter capable of varying optical pathlengths at frequencies of 1 GHz or more.

FIG. 11 presents a schematic diagram of an example embodiment of the system of the disclosure configured to perform a quadrature-amplitude modulation of optical signals. Using the similar reference numbers as in FIGS. 1-9, to depict similar component structures. With continuing reference to these figures, the apparatus 100 (e.g., an optical modulation system), comprises a substrate 210 (FIG. 2) with a planar surface, a first set 130 of optical waveguides, e.g., waveguides 130-1, 130-2, . . . , 130-(N/2) located on the planar surface and a second set 140 of optical waveguides (e.g., waveguides 140-1, 140-2, . . . , 140-(N/2)) located on the planar surface. Here, N is a positive even integer, and N/2 equals the total number of waveguides in the first set 130.

The optical waveguides of the first set and the optical waveguides of the second set are capable of producing phase offsets between light traveling through the optical waveguides of the first set and light travelling through optical waveguides of the second set. E.g., in some cases, optical phase shifters 180-1, 180-2, . . . 180(N/2), are optically coupled to each of the waveguides 140-1, 140-2, . . . , 140-(N/2) of the second set 140, and can be configured to produce phase offsets equal to about $\pi/2 \pm 10\%$, $\pi/2 \pm 5\%$, or even $\pi/2 \pm 2\%$. As further explained below, each one of the optical waveguides 130-1, 130-2, . . . , 130-(N/2) of the first set 130 is optically matched with one of the optical waveguides 140-1, 140-2, . . . , 140-(N/2) of the second set 140. For instance, in some embodiments, waveguide 130-1 is optically matched with waveguide 140-1, waveguide 130-2 is matched with waveguide 140-2, etc. . . . . The term, optically matched, as used herein, refers to the two waveguides of the first and second set being optically coupled to an optical resonator at about a same optical resonant frequency (e.g., $f_1, f_2, \ldots, f_M$) and, configured to be distributed about a same portion of a power of an optical signal.

The apparatus 100 further comprises optical resonators (e.g., optical resonators 150-1, 150-2, . . . 150-(N/2) and 160-1, 160-2, . . . , 160-(N/2)) located on the planar surface. For each of the optically matched optical waveguides from the first set 130 and the second set 140, one of the optical resonators is evanescently coupled to the optical waveguide of the first set 130 and another one of the optical resonators is evanescently coupled to the optical waveguide of the second set 140. The one optical resonator and the other one optical resonator are adjusted to respectively resonantly couple to the respective optical waveguides of the matched waveguides at about a same optical frequency.

For instance, when waveguide 130-1 is optically matched with waveguide 140-1, the one optical resonator 150-1 is evanescently coupled to the optical waveguide 130-1, and the other optical resonator 160-1 is evanescently coupled to the optical waveguide 140-1. In addition, the optical resonators 150-1 and 160-1 are adjusted so that they resonantly couple to optical waveguides 130-1 and 140-1, respectively, at about a same optical frequency (e.g., $f_1$).

As discussed in the context of FIGS. 1-10, in some embodiments, the resonant optical frequency (or equivalent resonant optical wavelength) of each optical resonator can be individually adjustable (e.g., via control lines 155, 165 as discussed in the context of FIG. 1). For instance, in some cases, such a resonant optical frequency can be adjusted by changing a majority charge carrier density within the optical resonator. In some cases, the resonant optical frequency can be adjusted by heating a portion of the optical resonator.

The apparatus 100 also comprises an optical power splitter 110 optically coupled to each of the optical waveguides 130-1, 130-2, . . . , 130-(N/2) of the first set 130 and each of the optical waveguides 140-1, 140-2, . . . , 140-(N/2) of the second set 140. For instance, in various embodiments of the apparatus 100, the optical power splitter 110 may be a multi-mode interferometer, a directional coupler, or a star coupler. For instance, in cases where there are N/2 waveguides in the first set 130 and N/2 waveguides in the second set 140, the optical power splitter 110 may be a 1×N power splitter.

The optical power splitter 110 distributes an optical signal having a different power to each of the waveguides of the first set 130 (e.g., signal carrier portions 120a-1, 120a-2, . . . 120a-(N/2)), and distributes an optical signal having a different power to each of the waveguides of the second set 140 (e.g., signal carrier portions 120b-1, 120b-2, . . . 120b-(N/2). Additionally, the optical power splitter 110 distributes an optical signal of about the same power to the optical waveguide from the first set 130 and the optical waveguide of the second set 140 of a matched pair.

For instance, when waveguide 130-1 is optically matched with waveguide 140-1, waveguide 130-2 is matched with waveguide 140-2, etc. . . . . , the optical power splitter 110 transmits power into the respective waveguides 130-1, 130-2, . . . , 130-N, of the first set 130 according to a series of relative power splitting ratios equal to $2^{(N/2)-1}, 2^{(N/2)-2}, \ldots, 1$, wherein N+1 is equal to the number of waveguides in the first set 130. In such embodiments, optical power splitter 110 transmits power into the matched waveguides 140-1, 140-2, . . . , 140-N of the second set 140 at about the same power splitting ratios. For instance, when the relative power splitting to waveguide 130-1 equals $2^{(N/2)-1}$, then the relative power splitting to waveguide 140-1 also equals $2^{(N/2)-1}$. One of ordinary skill would appreciate how the optical power splitter 110 could be configured to distribute optical signals 120a-1, 120a-2, . . . 120a-N, 120b-1, 120b-2, . . . 120b-N to the waveguide sets 130, 140 with various different series of relative power splitting ratios.

As further illustrated in FIG. 11, the systems 100 can further include an optical source 125 (e.g., any of the optical sources discussed above in the context of FIG. 1), which is optically coupled to the optical power splitter 110. For instance, the optical source 125 can be configured to deliver an optical carrier signal 120 to the optical power splitter 110 in the S band, C band or L band frequency range.

As also illustrated in FIG. 11, the systems 100 can further include an optical power combiner 170 configured to combine optical output from the waveguides of the first set 130 and the waveguides the second set 140 to form a combined optical output 199. For instance, in various embodiments of the apparatus 100, the optical power combiner 170 may be a multi-mode interferometer, a directional coupler or a star coupler. For instance, when there are N/2 waveguides in the first set 130 and N/2 waveguides in the second set 140, the optical power combiner 170 may be an N×1 power combiner.

In some embodiments of the apparatus 100, as illustrated in FIG. 11, a combined optical output 199 from the first set 130 and the second set 140 of optical waveguides includes a quadrature-amplitude modulated (QAM) optical signal. In some such embodiments, the quadrature-amplitude modulated optical signal includes a QAM $2^N$ signal, e.g., having N bits/symbol, where N/2 is equal to the number of waveguides in the first set 130.

The optical source (e.g., an input laser) can be split into $2 \times 2^{(N/2)-1}$ ports by the optical power splitter 110, with power splitting ratios of about 2(N/2)-1, 2(N/2)-2, . . . 1, for the first set 130 of waveguides and about the same power splitting ratios for the second set 140 of waveguides. Thus, each waveguide of the sets 130, 140 is coupled to an optical resonator (e.g., resonators 150, 160), to individually generate BPSK signals.

By an appropriate setting of the phase offset (e.g., via phase shifters 180-1, 180-2 . . . ) between the light emitted by a pair of matched waveguides of the first and second sets 130, 140 can be used as part of the generation of QPSK signals at the designated power level. By combining such QPSK signals having different power levels (e.g., at combiner 170), a light signal having a $2^N$-QAM modulation can be produced.

FIG. 12 schematically illustrates of an example embodiment of a system of the disclosure, which is configured to produce wavelength division multiplexed quadrature-amplitude modulated optical signals.

In such embodiments, each of the matched optical waveguides of the first set 130 evanescently couples to a sequence of the optical resonators (e.g., a sequence of M optical resonators 150-1-1, 150-1-2, . . . 150-1-M; 150-2-1, 150-2-2, 150-2-M; . . . ; 150-(N/2)-1, 150-(N/2)-2, . . . 150-(N/2)-M). Similarly, each of the matched optical waveguides of the second set 1v0 evanescently couples to another sequence of the optical resonators (e.g., optical resonators 160-1-1, 160-1-2, . . . 160-1-M; 160-2-1, 160-2-2, 160-2-M; . . . ; 160-(N/2)-1, 160-(N/2)-2, . . . 160-(N/2)-M).

In such embodiments, each of the optical resonators (e.g., 150-1-1, 150-1-2, etc. . . . ) of the sequence are individually adjustable to resonantly couple to the optical waveguides of the first set 130 at one of a sequence of different optical frequencies (e.g., $f_1, f_2, \ldots f_M$). Similarly, each of the optical resonators of the other sequence are individually adjustable to resonantly couple to the optical waveguides of the second set 140 at one of the sequence of different optical frequencies (e.g., the same sequence of different optical frequencies $f_1$, $f_2, \ldots f_M$).

In embodiments such as depicted in FIG. 12, a combined optical output 199 from the first set 130 of optical waveguides and the second set 140 of optical waveguides can include a wavelength division multiplexed quadrature-amplitude modulated optical (WDM QAM) signal. For instance, in some such embodiments, at each one of the sequence of different optical frequencies (corresponding to wavelength division multiplexed signals), the QAM optical signal includes a separate QAM $2^N$ signal, having N bits/symbol, where N/2 is equal to the number of waveguides in the first set 130.

FIG. 13 presents a flow diagram of a method 1300 e.g., a method of manufacturing an apparatus such as any of the example apparatuses 100 (e.g., QAM optical modulation systems) discussed in the context of FIGS. 11-12, and, including any of the components discussed in the context of FIGS. 1-10.

The method 1300 comprises a step 1305 of providing a substrate 210 with a planar surface, a step 1310 of forming a first set 130 of optical waveguides (e.g., waveguides 130-1, 130-2 . . . ) on the planar surface and a step 1315 of forming a second set 140 of optical waveguides (e.g., waveguides 140-1, 140-2 . . . ) on the planar surface. As discussed in the context of FIG. 11, there is a phase offset between the optical waveguides of the first set 130 and the optical waveguides of the second set 140, and, each one of the optical waveguides of the first set 130 is optically paired with one of the optical waveguides of the second set 140.

The method 1300 also comprises a step 1320 of forming optical resonators (e.g., resonators 150, 160) on the planar surface. As discussed in the context of FIG. 11, each optical waveguide of the first set is paired with a corresponding optical waveguide of the second set. One of the optical resonators is evanescently coupled to the optical waveguide of the first set and another one of the optical resonators is evanescently coupled to the paired optical waveguide of the second set. For such a pair of optical waveguides, the one optical resonator and the other one optical resonator are adjustable to resonantly couple to the respective optical waveguides of the paired waveguides at about a same optical frequency.

The method 1300 also comprises a step 1325 of making an optical power splitter 110 to optically couple to each of the waveguides of the first set 130 and the second set 140. As discussed in the context of FIG. 11, the optical power splitter may be configured to distribute optical signals having different powers to each of the waveguides of the first set and may be configured to distribute different powers to each of the waveguides of the second set. The optical power splitter is configured to distribute about the same power to paired optical waveguides from the first set and the second set.

Some embodiments of the step 1325 of making the optical power splitter 110 can include forming on the planar surface, a multi-mode interferometer, a directional coupler or star coupler.

Any embodiments of the method 1300 can further include a step 1330 of forming adjustable optical phase shifters (e.g., phase shifters 180-1, 180-2 . . . ) adjacent to the waveguides of the first set 130 or the waveguides of the second set 140.

Any embodiments of the method 1300 can further include a step 1335 of optically coupling an optical source 125 to the optical power splitter 110 such that an optical carrier signal 120 from the optical source 125 will be distributed to the waveguides of the first set 130, and, the second set 140.

Any embodiments of the method 1300 can further include a step 1340 of making an optical power combiner 170 that is optically coupled to each of the waveguides of the first set 130 and the second set 140 and is configured to combine optical output from each of the waveguides of the first set 130 and the second set 140 into a combined optical output 199.

Some embodiments of the step 1340 of making the optical power combiner 170 can include forming on the planar surface, a multi-mode interferometer, a directional coupler or a star coupler.

Some embodiments of the step 1320 of forming the optical resonators further includes, for each of the paired optical waveguides of the first set and the second set: forming, in step 1350, a sequence of the optical resonators that are evanescently coupled to each of the optical waveguides of the first set 130, and in step 1360, forming another sequence of the optical resonators that are evanescently coupled to each of the optical waveguides of the second set 140.

As discussed in the context of FIG. 12, each of the optical resonators of the sequence are individually adjustable to resonantly couple to the optical waveguides of the first set at one of a sequence of different optical frequencies, and, each of the optical resonators of the other sequence are individually adjustable to resonantly couple to the optical waveguides of the second set at one of the sequence of different optical frequencies.

In some embodiments of the method 1300, one or more, and in some cases all, of the optical power splitter 110, the optical waveguides (130-1, 130-2, . . . ; 140-1, 140-2, . . . ), the optical resonators (150-1, 150-2, . . . ; 160-1, 160-2 . . . ), the optical power combiner 170, and phase shifters (180-1, 180-2 . . . ) are formed in their respective steps on a common plane of a common substrate, e.g., a silicon substrate 210 located over a dielectric layer.

FIG. 14 presents a flow diagram of a method, e.g., method of manufacturing an apparatus, such as any of the example apparatuses discussed in the context of FIGS. 11-12 and, including any of the components discussed in the context of FIGS. 1-10.

The method comprises a step 1405 of providing a substrate with a planar surface. The method comprises a step 1410 of providing an optical power splitter on the surface and step 1415 of providing an optical power combiner on the surface. The method comprises a step 1420 of providing pairs of optical waveguides located on the planar surface, each waveguide of the pairs connecting a corresponding output of the optical power splitter to a corresponding input of the optical power combiner. The method comprises a step 1425 of providing a plurality of optical resonators located on the surface, each of the resonators of the plurality being evanescently coupled to a corresponding one of the waveguides. For each particular one of the pairs, resonant frequencies of the optical resonators coupled to the waveguides of the particular one of the pairs are about the same. Resonant frequencies of each pair of the optical resonators coupled to two of the waveguides in different ones of the pairs are different. Some embodiments of the method comprise a step 1430 of providing an optical source optically coupled to the optical power splitter and configured to deliver an optical carrier signal to the optical power splitter in the S band, C band or L band frequency range.

Those skilled in the art to which this application relates will appreciate that other and further additions, deletions, substitutions and modifications may be made to the described embodiments.

What is claimed is:

1. An apparatus, comprising:
a substrate with a planar surface;
an optical power splitter on the surface;
an optical power combiner on the surface;
pairs of optical waveguides located on the planar surface, each waveguide of the pairs connecting a corresponding output of the optical power splitter to a corresponding input of the optical power combiner;
a plurality of optical resonators located on the surface, each of the resonators of the plurality being evanescently coupled to a corresponding one of the waveguides; and
wherein for each particular one of the pairs, resonant frequencies of the optical resonators coupled to the waveguides of the particular one of the pairs are about the same; and
wherein resonant frequencies of each pair of the optical resonators coupled to two of the waveguides in different ones of the pairs of optical waveguides are different.

2. The apparatus of claim 1, wherein for each specific one of the pairs, the optical power splitter is configured to distribute about the same optical power to both of the waveguides of the specific one of the pairs.

3. The apparatus of claim 2, wherein the optical power splitter is configured to distribute different optical powers to different ones of the pairs of optical waveguides.

4. The apparatus of claim 1, wherein the optical power splitter is configured to distribute different optical powers to different ones of the pairs of optical waveguides.

5. The apparatus of claim 4, wherein the optical power splitter is configured to distribute optical powers to the different first, second, and third of the pairs of waveguides such that a ratio of the optical power distributed to the first of the pairs over the optical power distributed to the second of the pairs is about ½ and a ratio of the optical power distributed to the first of the pairs over the optical power distributed to the third of the pairs is about ¼.

6. The apparatus of claim 1, further including an optical source optically coupled to the optical power splitter and configured to deliver an optical carrier signal to the optical power splitter in the S band, C band or L band frequency range.

7. The apparatus of claim 1, wherein the optical resonators are configured to be controllable such that the apparatus is able to output a quadrature-amplitude modulated optical signal including each signal point of a quadrature-amplitude modulation constellation including signal points of different positive amplitude.

8. The apparatus of claim 7, wherein the constellation includes a quadrature amplitude modulated $2^N$ signal, having N bits/symbol, where N/2 is equal to the number of the pairs of optical waveguides.

9. The apparatus of claim 1, wherein each specific one of the optical waveguides is evanescently optically coupled to a specific sequence of the optical resonators, each of the optical resonators of the specific sequence configured to resonantly couple at a different optical frequency.

10. The apparatus of claim 9, wherein the apparatus is configured to produce a wavelength division multiplexed quadrature-amplitude modulated optical signal from an optical signal having a plurality of unmodulated optical carriers on non-overlapping optical wavelength channels and being received at an input of the optical power splitter.

11. A method, comprising:
providing a substrate with a planar surface;
providing an optical power splitter on the surface;
providing an optical power combiner on the surface;
providing pairs of optical waveguides located on the planar surface, each waveguide of the pairs connecting a corresponding output of the optical power splitter to a corresponding input of the optical power combiner;
providing a plurality of optical resonators located on the surface, each of the resonators of the plurality being evanescently coupled to a corresponding one of the waveguides; and
wherein for each particular one of the pairs, resonant frequencies of the optical resonators coupled to the waveguides of the particular one of the pairs are about the same; and
wherein resonant frequencies of each pair of the optical resonators coupled to two of the waveguides in different ones of the pairs of optical waveguides are different.

12. The method of claim 11, wherein for each specific one of the pairs, the optical power splitter is configured to distribute about the same optical power to both of the waveguides of the specific one of the pairs.

13. The method of claim 12, wherein the optical power splitter is configured to distribute different optical powers to different ones of the pairs of optical waveguides.

14. The method of claim 11, wherein the optical power splitter is configured to distribute different optical powers to different on of the pairs of optical waveguides.

15. The method of claim 14, wherein the optical power splitter is configured to distribute optical powers to the different first, second, and third of the pairs of waveguides such that a ratio of the optical power distributed to the first of the pairs over the optical power distributed to the second of the pairs is about ½ and a ratio of the optical power distributed to the first of the pairs over the optical power distributed to the third of the pairs is about ¼.

16. The method of claim 11, further including providing an optical source optically coupled to the optical power splitter and configured to deliver an optical carrier signal to the optical power splitter in the S band, C band or L band frequency range.

17. The method of claim 11, wherein the optical resonators are configured to be controllable such that an apparatus is able to output a quadrature-amplitude modulated optical signal including each signal point of a quadrature-amplitude modulation constellation including signal points of different positive amplitude.

18. The method of claim 17, wherein the constellation includes a quadrature-amplitude modulated $2^N$ signal, having N bits/symbol, where N/2 is equal to the number of the pairs of optical waveguides.

19. The method of claim 11, wherein for each specific one of the optical waveguides is evanescently optically coupled to a specific sequence of the optical resonators, each of the optical resonators of the specific sequence configured to resonantly couple at a different optical frequency.

* * * * *